(12) United States Patent
Takagi

(10) Patent No.: US 6,577,162 B2
(45) Date of Patent: Jun. 10, 2003

(54) STEP-UP CIRCUIT

(75) Inventor: Tetsuo Takagi, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/947,939

(22) Filed: Sep. 6, 2001

(65) Prior Publication Data

US 2002/0042175 A1 Apr. 11, 2002

(30) Foreign Application Priority Data

Sep. 7, 2000 (JP) ........................................ 2000-271586

(51) Int. Cl.$^7$ .......................................... H03K 19/0175
(52) U.S. Cl. .............................. 326/80; 326/88; 326/92
(58) Field of Search ............................. 326/80, 88, 92; 327/534, 536, 537, 538, 390; 363/59, 60

(56) References Cited

U.S. PATENT DOCUMENTS 5,029,063 A * 7/1991 Lingstaedt et al. ........... 363/60
5,801,934 A * 9/1998 Lacey et al. .................. 363/60

OTHER PUBLICATIONS

An On–Chip High–Voltage Generator Circuit for EEPROMs with a Power Supply Voltage below 2V; Kikuzo Sawada, Yoshikazu Sugawara, and Shoichi Masui; 1995 Symposium on VLSI Circuits Digest of Technical Papers; pp. 75 and 76.
MOS Charge Pumps for Low–Voltage Operation; Jieh–Tsorng Wu, Kuen–Long Chang; IEEE Journal of Solid–State Circuits; Apr. 4, 1998; pp. 592–597.

* cited by examiner

Primary Examiner—Michael Tokar
Assistant Examiner—Anh Tran
(74) Attorney, Agent, or Firm—Harness, Dickey & Pierce, P.L.C.

(57) ABSTRACT

A step-up circuit is equipped with a plurality of serially connected rectification elements Q1, Q2, ... between a first node and a second node, a plurality of capacitors C1, C2, ... connected to connection points of the plurality of rectification elements, respectively, and an oscillation loop that is formed by circularly and serially connecting an odd number of inversion devices NAND, INV1, INV2, ..., each inverting an input signal and outputting the same, and supplies an alternating current signal having a specified phase to the plurality of capacitors.

7 Claims, 10 Drawing Sheets

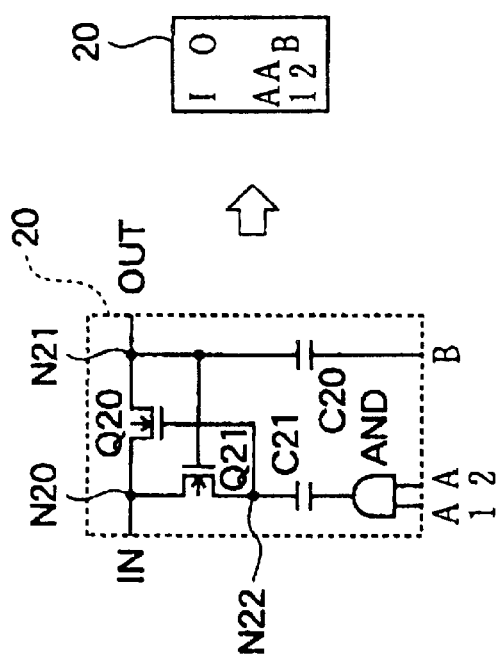
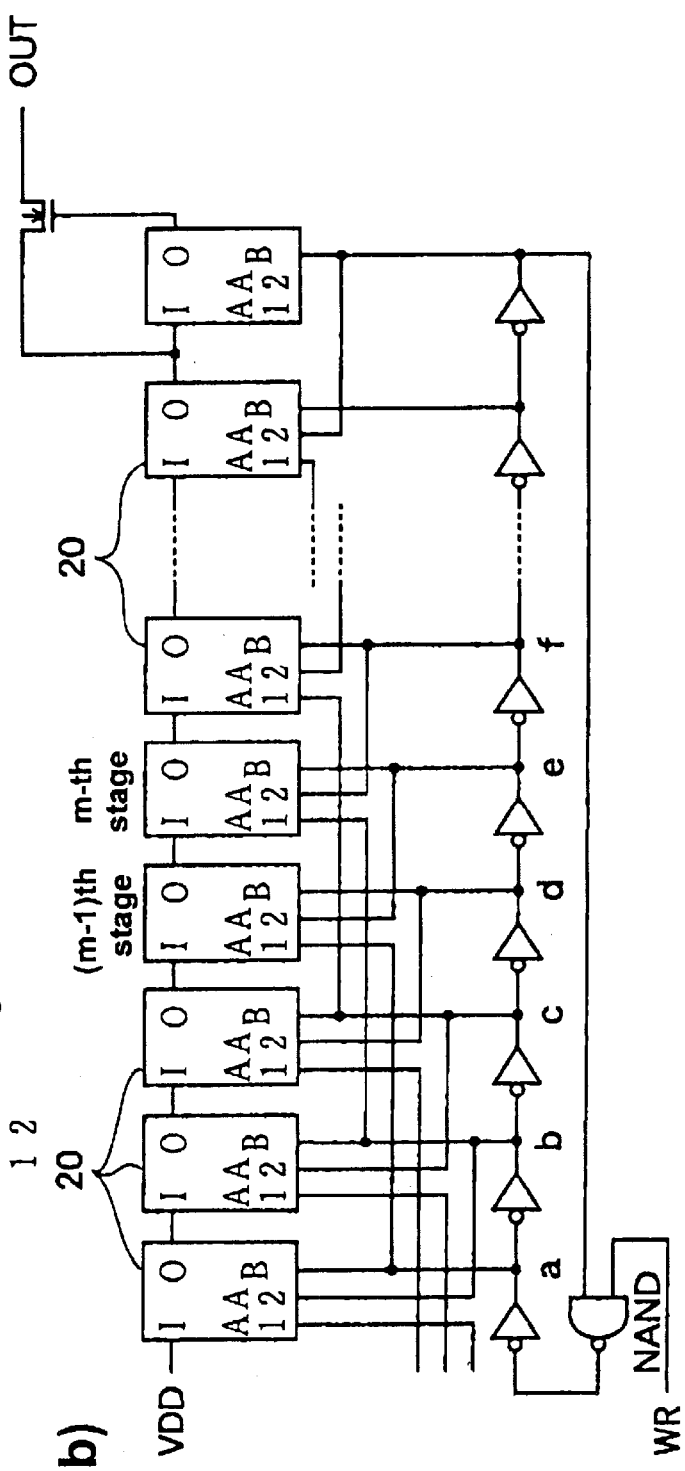
Fig. 3 (a)
Fig. 3 (b)

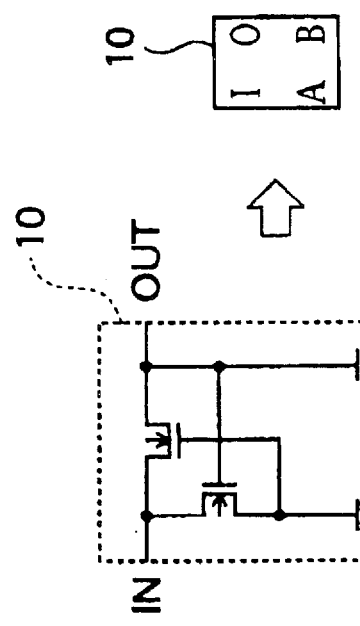
Fig. 8 (a) Prior Art
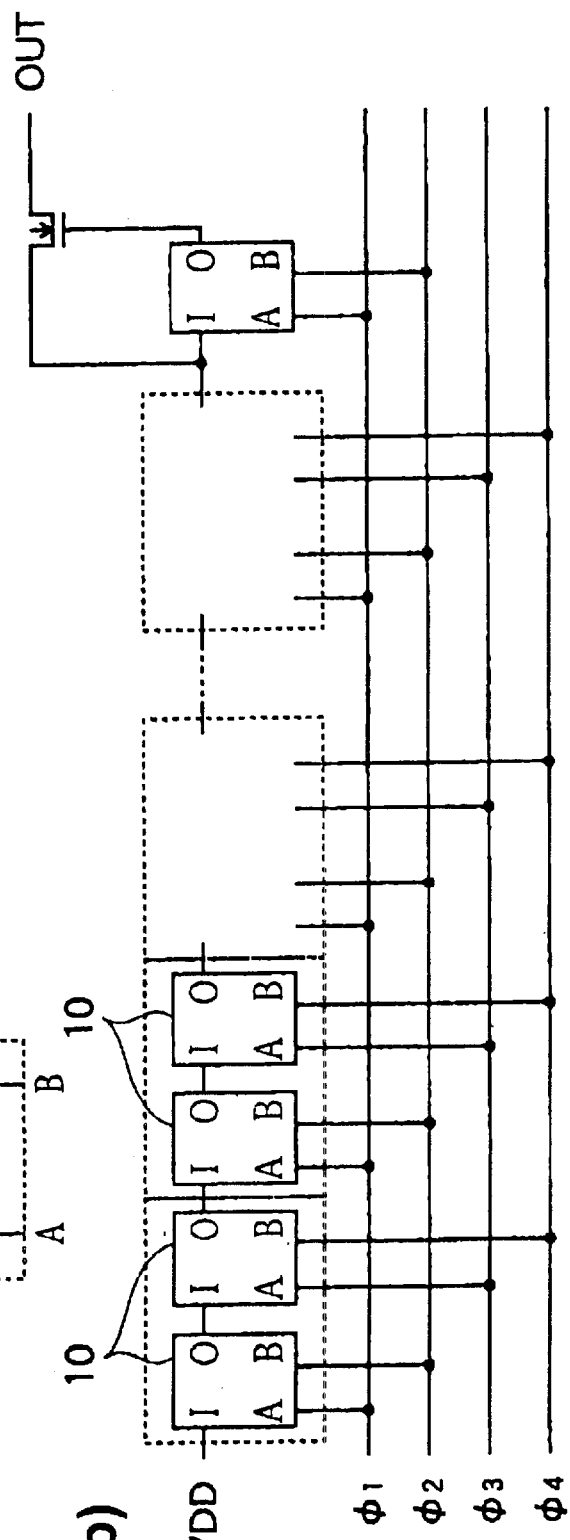
Fig. 8 (b) Prior Art

STEP-UP CIRCUIT

BACKGROUND OF THE INVENTION

1. Technical Field of the Invention

The present invention relates to a step-up circuit, and more particularly to a step-up circuit that uses MOS-FETs.

2. Conventional Technology

To write data in, for example, an E²PROM, a voltage of 12~18 V is required. However, power supply voltage in recent ICs is direct current voltage of 3~5 V, and therefore the power supply voltage must be stepped up by a step-up circuit in order to drive the E²PROM with such a voltage.

In general, in semiconductor integrated circuits including E²PROMs, the P-substrate process has been used in view of the device characteristic, and therefore step-up circuits that use N-channel MOS-FETs as substitution of diodes have been widely used. FIG. 7 shows a circuit diagram of such a conventional step-up circuit described above.

Referring to FIG. 7, an oscillation block 1 includes a NAND circuit and an odd number of inversion circuits composed of inverters INV41, INV42, ... which are circularly connected to one another, and capacitors C41, C42, .... One terminal of each of the capacitors C41, C42, ... is connected to an input terminal of each of the inverters INV41, INV42, ..., respectively, and the other terminal is connected to a power supply voltage $V_{SS}$ on a low potential side (grounded in the example).

Also, a step-up block 2 includes rectification circuits in a plurality of stages. The rectification circuit in each of the stages includes one of the N-channel transistors (MOS-FETs) Q51, Q52, ..., and one of the capacitors C51, C52, .... A source of the transistor in each of the stages is connected to a drain and a gate of the transistor in the next stage. Furthermore, the transistor Q55 that is connected to the rectification circuit in the last stage prevents reverse current from an output terminal.

Next, an operation of the step-up circuit is described. When a write control signal WR is input in the NAND gate, the oscillation block 1 starts an oscillation operation and outputs a clock signal. The clock signal output from the oscillation block 1 is inverted by an inverter INV50 to become a clock signal CL50, which is further inverted by an inverter INV51 to become an inverted clock signal CL51. The clock signal CL50 and the inverted clock signal CL51 are alternately supplied to the capacitors in the respective stages in the step-up block 2, and rectified by the N-channel transistors in the respective stages. As a result, a direct current voltage that is stepped up from a power supply voltage $V_{DD}$ on a high potential side is generated on an output OUT of the step-up circuit.

It is noted that, among E²PROMs, in particular, those operating at a low voltage operate at a power supply voltage of 3V or lower. However, such E²PROMs still need a voltage of 15V or higher when a writing operation is performed. In this case, the step-up circuit described above does not provide enough stepped-up voltage, and therefore needs to be provided with an auxiliary step-up circuit at each of the stages in the step-up circuit.

FIG. 8(a) shows a step-up cell 10 in which an auxiliary step-up circuit is connected to each of the stages of the step-up circuit. Also, FIG. 8(b) shows in part a step-up circuit in which a plurality of the step-up cells 10 described above are connected to one another. Points A and B at which clock signals are input in each of the step-up cells 10 are alternately connected to two lines that carry clock signals $\phi 1$ and $\phi 2$ and to two lines that carry clock signals $\phi 3$ and $\phi 4$. In this manner, by the step-up circuit shown in FIG. 8(b), four-phase clocks having different phases are required. In order to make them, a timing generation circuit must be connected between the oscillation block and the step-up block. Accordingly, in the conventional art, a timing generation circuit shown in FIG. 9 is used to generate four-phase clock signals shown in FIG. 10.

Both of the oscillation block 1 and the step-up block 2 of the conventional step-up circuit shown in FIG. 7 are equipped with capacitors. Therefore, when such a step-up circuit is integrated (into an IC), a problem occurs in that its chip area increases.

Also, a step-up circuit used in an E²PROM that operates at a low voltage, such as the one shown in FIG. 8(b), needs to generate four-phase clock signals by a timing generation circuit. For this requirement, the chip area increases when it is integrated into an IC. Also, when the circuit is laid out on a substrate, a step-up block, an oscillation block and a timing generation block have to be disposed separately from one another, with the result that the placement effect deteriorates, which results in an increased chip area.

Furthermore, when step-up cells shown in FIG. 8(a) are serially connected to obtain a required voltage, the first operation is normally performed. However, since a stepped-up charge of the previous round remains in the capacitors of the step-up circuit, an abnormality is generated in the waveform of stepped-up voltage. Also, since a charge-discharging period is required between a first step-up operation and a second step-up operation, a time loss occurs in writing in the memory.

In view of the above, it is a first object of the present invention to provide a step-up circuit that can reduce a chip area as compared to conventional techniques. Also, it is a second object of the present invention to provide a step-up circuit that has good area utilization efficiency. Furthermore, it is a third object of the present invention to provide a step-up circuit that minimizes abnormality generation in the step-up waveform and has a high step-up speed.

SUMMARY OF THE INVENTION

To solve the problems described above, a step-up circuit in accordance with one aspect of the present invention is a step-up circuit to step-up a direct current potential applied to a first node and output the same from a second node, comprising: a plurality of serially connected rectification elements between the first node and the second node; a plurality of capacitors connected to connection points of the plurality of rectification elements respectively; and an oscillation loop that is formed by circularly and serially connecting an odd number of inversion devices, each inverting an input signal and outputting the same, and supplying an alternating current signal having a specified phase to the plurality of capacitors.

Here, each of the plurality of capacitors may be formed from an N-channel transistor. Also, the plurality of capacitors may be connected between connection points of the plurality of rectification elements and connection points of the odd number of inversion devices, respectively. As a result, the capacitors can be commonly used by a step-up block and an oscillation block, so that the chip area can be reduced.

Also, a step-up circuit in accordance with a second aspect of the present invention is a step-up circuit to step-up a direct current potential applied to a first node and output the same from a second node, comprising: a first group of N-channel transistors with source and drain paths being serially connected between the first node and the second node; a second group of N-channel transistors that open and close paths between inputs and gates of the first group of N-channel transistors, respectively, according to a potential of an output of the first group of N-channel transistors; a first group of capacitors connected to connection points of the outputs of the first group of N-channel transistors, respectively; an oscillation loop that is formed by circularly and serially connecting an odd number of inversion devices, each inverting an input signal and outputting the same, and supplying an alternating current signal having a specified phase to the first group of capacitors; a second group of capacitors connected to gates of the first group of N-channel transistors, respectively; and a device that forms a signal to be supplied to the second group of capacitors based on an output signal of a specified one of the inversion devices of the oscillation loop.

By the structures described above, when clock signals with three or more phases are used, a step-up block, a timing generation block and an oscillation block can be realized by arrays of cells, respectively, such that the utilization efficiency of the substrate area can be improved.

Here, the step-up circuit may further be equipped with at least one N-channel transistor that moves a positive charge from a node that supplies a power supply potential on a high potential side to at least one of the first group of capacitors, and at least one N-channel transistor that moves a positive charge from a node that supplies a power supply potential on a low potential side to at least one of the second group of capacitors. By adding a transistor for discharge to each of the nodes on the capacitors in the step-up circuit, an abnormality in the step-up voltage waveform in a second step-up operation does not occur, and the transistor for discharge operates as a transistor for rectification when a step-up operation is performed, such that the step-up operation speed is increased.

Also, the first group of capacitors may be connected between connection points of the first group of N-channel transistors and connection points of the odd number of inversion devices. As a result, the capacitors can be commonly used by a step-up block and an oscillation block, whereby the chip area can be reduced.

BRIEF DESCRIPTION OF THE DRAWINGS

FIGS. 3a and 3b show a circuit diagram of a step-up circuit in accordance with a second embodiment of the present invention.

FIGS. 8a and b show a circuit diagram of another conventional step-up circuit.

DETAILED DESCRIPTION OF THE PREFERRED EMBODIMENTS

Embodiments of the present invention are described with reference to the accompanying drawings. It is noted that the same components are referred to by the same reference numbers, and their description is omitted.

Figure 1:
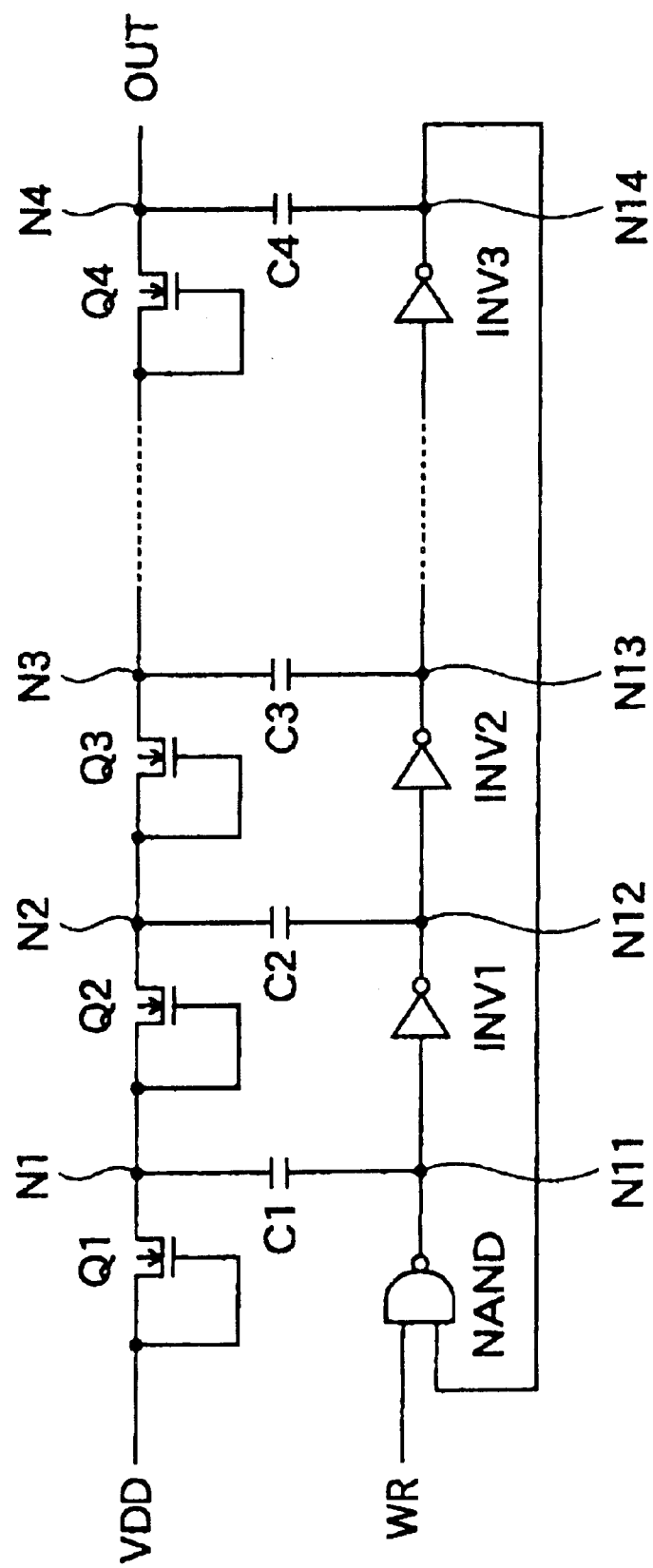
FIG. 1 shows a circuit diagram of a step-up circuit in accordance with a first embodiment of the present invention.

FIG. 1 shows a circuit diagram of a step-up circuit in accordance with a first embodiment of the present invention. As shown in FIG. 1, an oscillation loop is formed by a NAND gate and an odd number of inversion circuits composed of inverters INV1, INV2, . . . , which are circularly disposed with one another, and capacitors C1, C2, . . . Also, each transistor Q1, Q2, . . . , and each capacitor C1, C2, . . . forms one stage of the rectification circuit. In this manner, the step-up circuit of the present embodiment is characterized in that the capacitors, which have been independently included in an oscillation block and a step-up block in a conventional step-up circuit, are commonly shared by the step-up block and the oscillation block.

Next, an operation of the step-up circuit in accordance with the present embodiment is described. When a write control signal WR is input in the NAND gate, the oscillation block that includes an odd number of inversion circuits starts an oscillation operation and outputs a clock signal. As a result, clock pulses that have mutually opposite phases are generated at nodes N11, N12, . . . The clock pulses are supplied to nodes N1, N2, . . . through the capacitors C1, C2, . . . In the step-up block, current flows from the node N1 to the node N2, and from the node N2 to the node N3, due to the operation of the N-channel transistors functioning as rectification elements. As a result, a direct current voltage that is stepped up from a power supply voltage $V_{DD}$ on a high potential side is generated on an output OUT of the step-up circuit.

When the clock signal oscillates between the power supply voltage on a high potential side $V_{DD}$ and the power supply voltage on a low potential side $V_{SS}$, a direct current voltage $V_{OUT}$ that is output from an n-th stage is given by the following formula:

$$V_{OUT}=V_{DD}+n(V_{DD}-V_{SS}-V_{TH}),$$

where $V_{TH}$ is a threshold voltage between a gate and a source of an N-channel transistor.

In the manner described above, in accordance with the present embodiment, since the step-up block and the oscillation block use the capacitors in common, the area can be reduced when they are integrated.

Figure 2:
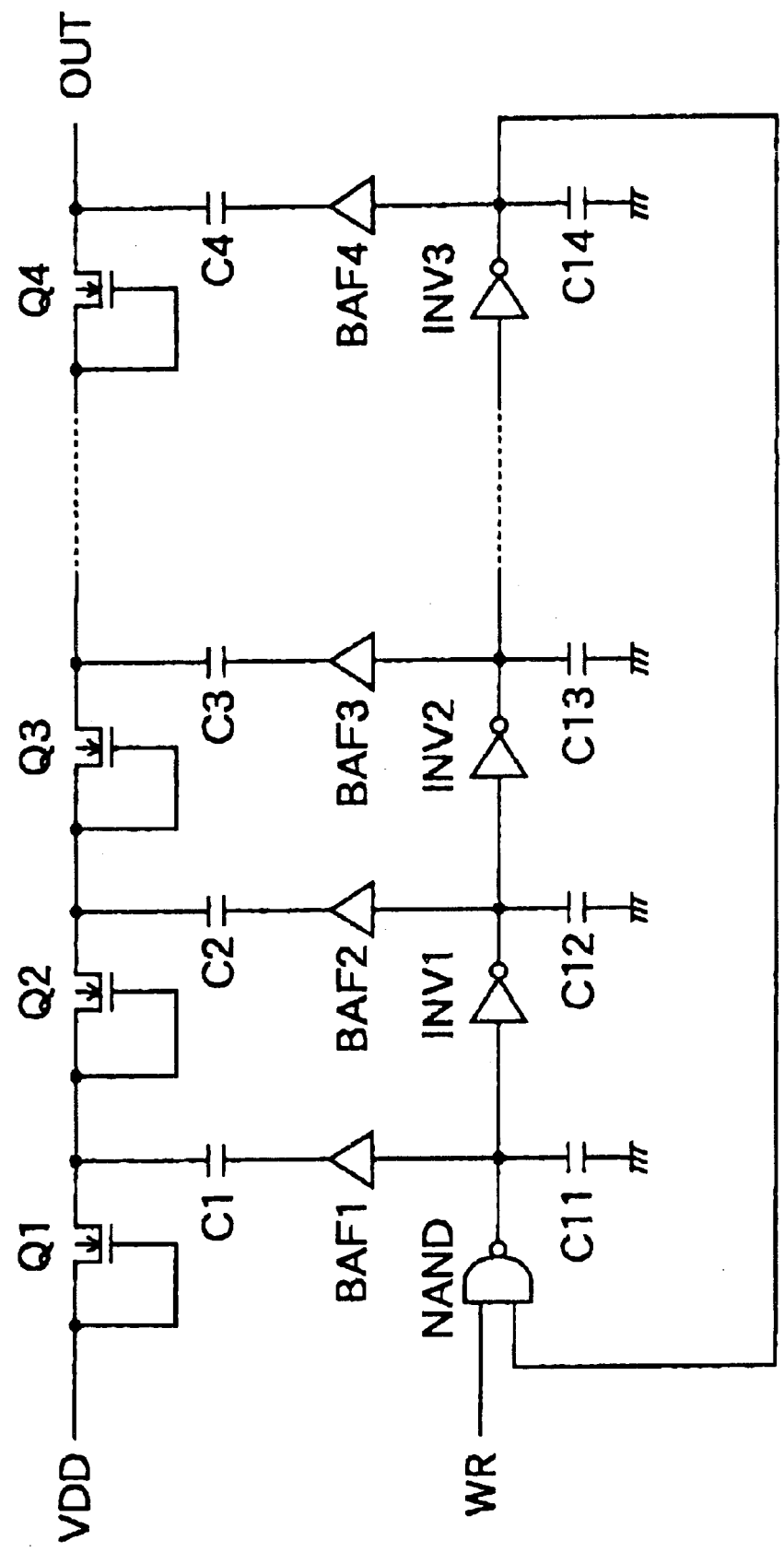
FIG. 2 shows a circuit diagram of a step-up circuit of a modified example of the first embodiment of the present invention.

FIG. 2 shows a circuit diagram of a step-up circuit of a modified example of the first embodiment of the present invention. In the modified example, capacitors are provided individually for the step-up block and the oscillation block. As shown in FIG. 2, capacitors C11, C12, . . . are connected to outputs of a NAND gate and inverters INV1, INV2, . . . , which are circularly disposed with respect to one another, and further, clock signals are supplied from their respective connection points to capacitors C1, C2, . . . through buffers BAF1, BAF2, . . .

Figure 4:
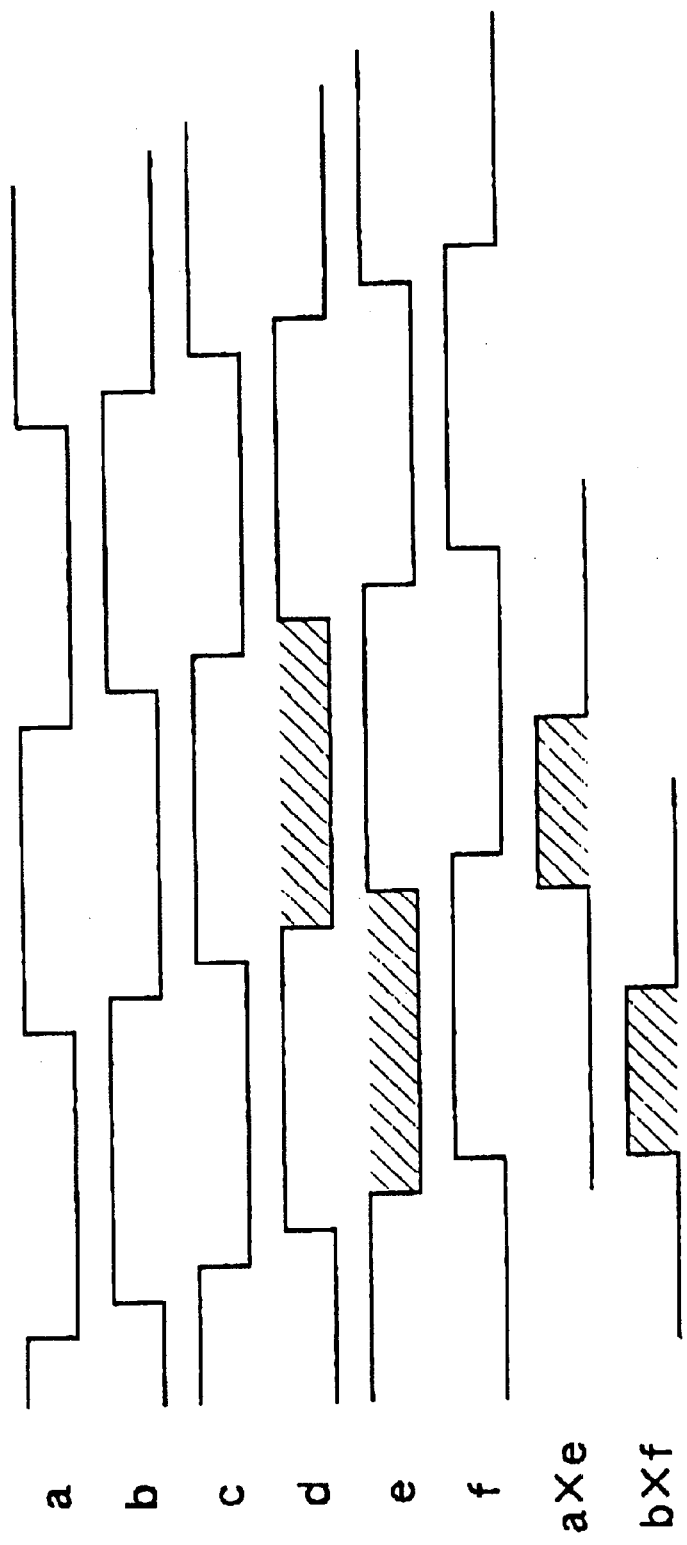
FIG. 4 shows a timing chart of clock signals that are generated in the step-up circuit in accordance with the second embodiment.

Next, a step-up circuit in accordance with a second embodiment of the present invention is described with reference to FIGS. 3 and 4. FIG. 3(a) shows a circuit diagram of a step-up cell in one stage that is included in the step-up circuit of the present embodiment. FIG. 3(b) shows a circuit diagram of a step-up circuit that includes a plurality of step-up cells and an oscillation loop that supplies clock signals to the respective step-up cells. Furthermore, FIG. 4 shows a timing chart of the clock signals that are generated by the oscillation loop.

The step-up circuit in accordance with the present embodiment is characterized in that, in addition to the common use of the capacitors to be included in the oscillation loop and those to be included in the step-up cells, four-phase timings are generated using timing deviation occurring at each stage of the oscillation loop.

As shown in FIG. 3(a), a step-up cell 20 in one stage in accordance with the present embodiment has a logic circuit (AND gate in the present embodiment) for decoding an input clock signal, which is added to a conventional step-up cell composed of two transistors Q20 and Q21 and two capacitors C20 and C21.

An operation of the step-up circuit of the present embodiment is described. Referring to FIG. 3(b), when a write control signal WR is input in a NAND gate, the oscillation loop that includes the NAND gate and a plurality of inverters serially connected to one another starts an oscillation operation. A clock signal that is output from each of the stages of the oscillation loop repeats inversion and circulates through the oscillation loop.

Now, let us assume that, in the step-up cell at the m-th stage, an input B is at a low level and an output at the AND gate is at a high level, such that a drain current flows in the transistor Q20, and a charge is stored in the capacitor C20. Then, when the inputs are inverted, a current flows in from the step-up cell at the (m−1)-th stage to the node N20. Meanwhile, the node N21 applies a gate voltage to the transistor Q21. As a result, a drain current flows in the transistor Q21, and a charge is stored in the capacitor C21. When the inputs are inverted again, the node N22 applies a gate voltage to the transistor Q20, and drain current flows in the transistor Q20. By repeating these steps, the potential can be gradually elevated from the first stage to the nth stage of the step-up cells.

FIG. 4 shows waveforms of clock signals at each of the points a~f. As shown in FIG. 4, a specified deviation in the timing occurs in the clock signal at each of the points. It is noted that clock signals input in the circuit at the (m−1)-th stage are a clock signal generated at point a that is input in an input A1, a clock signal generated at point e that is input in an input A2, and a clock signal generated at point d that is input in an input B. Also, clock signals input in the circuit at the m-th stage are a clock signal generated at point b that is input in an input A1, a clock signal generated at point f that is input in an input A2, and a clock signal generated at point e that is input in an input B. By the operation of the AND gate in each of the step-up cells, the signals input in the (m−1)-th stage result in "a×e" and d. Similarly, the signals input in the m-th stage result in "b×f" and e. It is understood from waveforms for "a×e", d, "b×f" and e shown in FIG. 4 that four-phase clocks having different phases are generated. In a similar manner, four-phase clocks can also be generated at other stages.

In accordance with the embodiment of the present invention, the logic circuits added in the cells and deviations in the timing in the oscillation block are utilized to generate clock signals having different phases. As a result, a step-up block, an oscillation block and a timing generation block do not need to be divided from one another when they are laid out on a substrate, and can be realized by arrays of cells. Therefore, a two-stage step-up circuit can be effectively disposed on a substrate.

Figure 5:
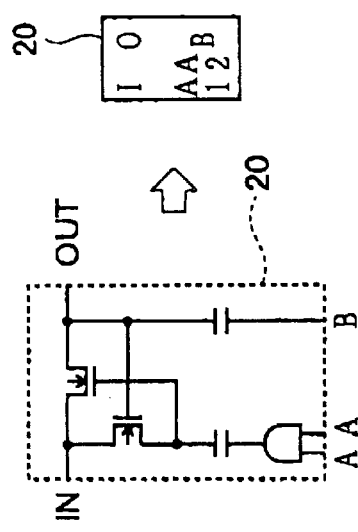
FIGS. 5a and 5b show a circuit diagram of a step-up circuit of a modified example of the second embodiment of the present invention.
Figure 5:
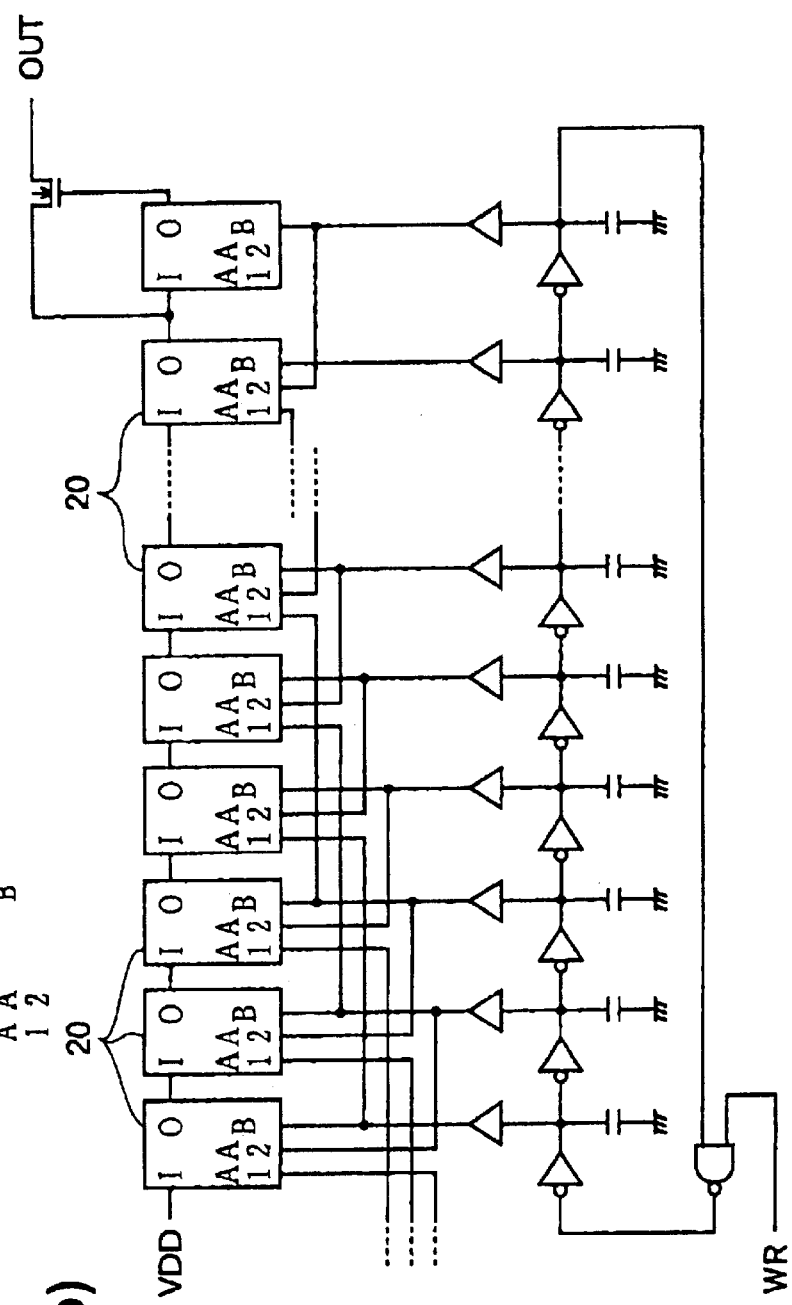

FIG. 5 shows a circuit diagram of a step-up circuit of a modified example in accordance with the second embodiment of the present invention. In the modified example, capacitors are provided individually for the step-up block and the oscillation block. As a step-up cell 20 shown in FIG. 5(a), the same one shown in FIG. 3(a) is used. Also, as shown in FIG. 5(b), capacitors are connected to outputs of a NAND gate and a plurality of inverters, which are circularly disposed, and further, clock signals are supplied from their respective connection points to the step-up cells 20 through buffers, respectively.

Figure 6:
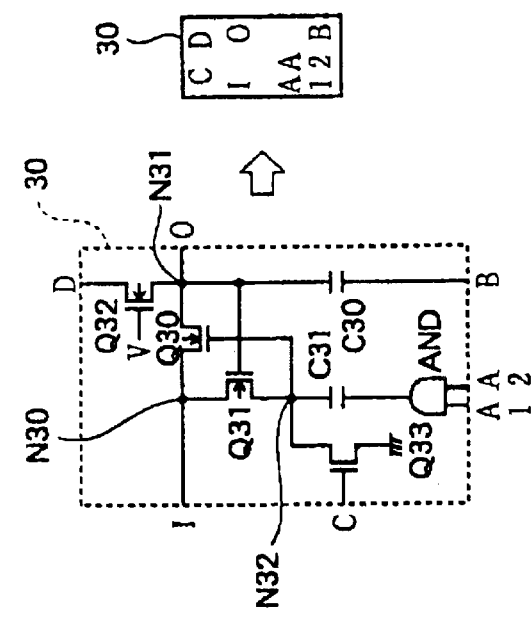
FIGS. 6a and 6b show a circuit diagram of a step-up circuit in accordance with a third embodiment of the present invention.
Figure 6:
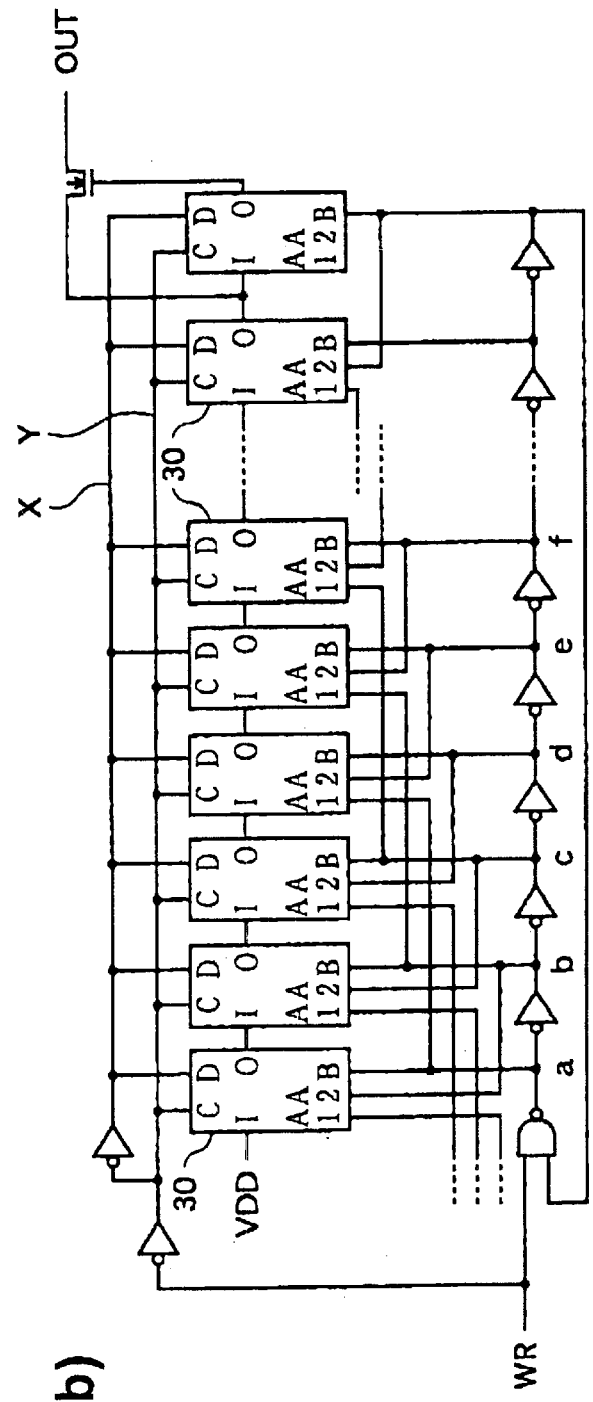
Figure 7:
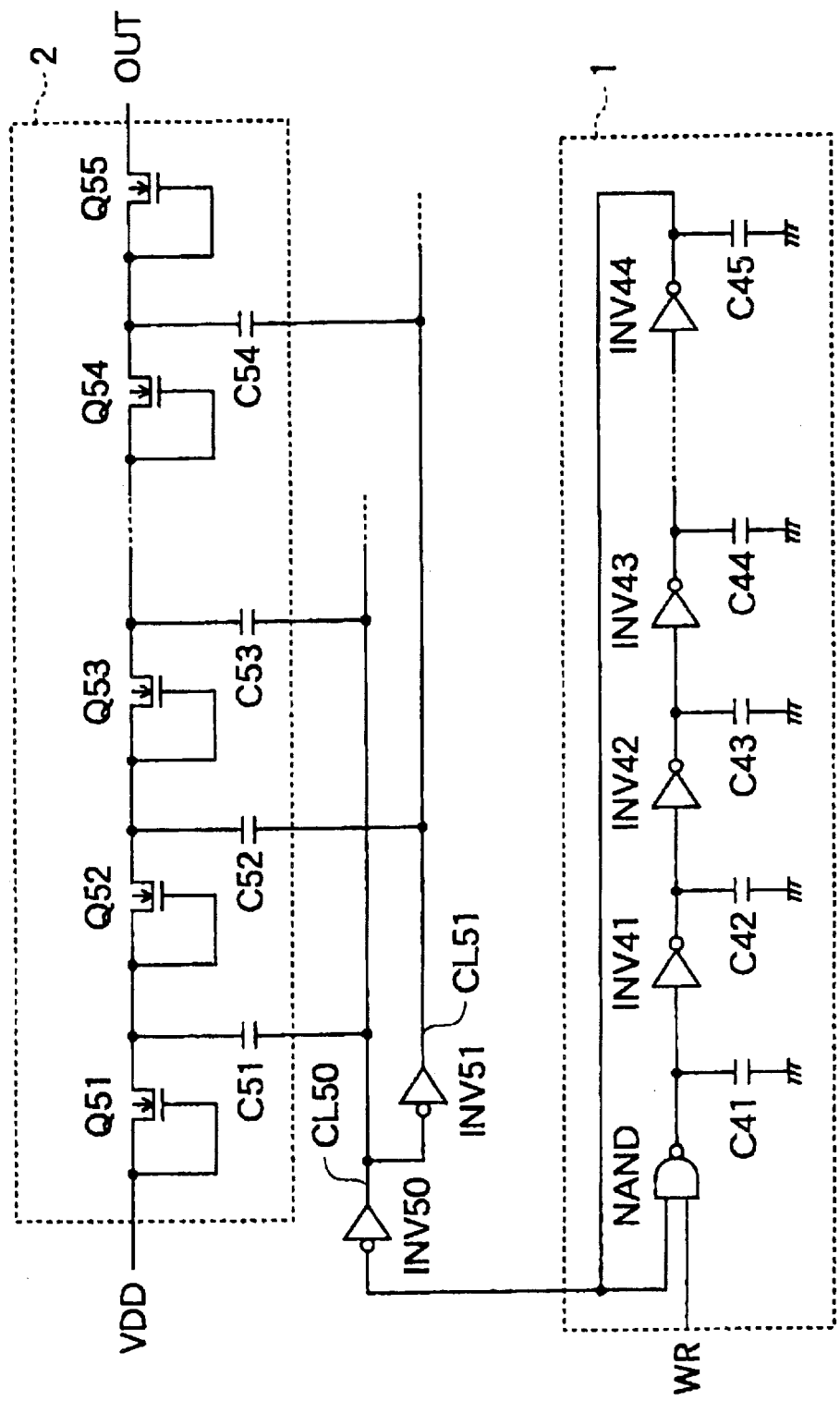
FIG. 7 shows a circuit diagram of a conventional step-up circuit.
Figure 9:
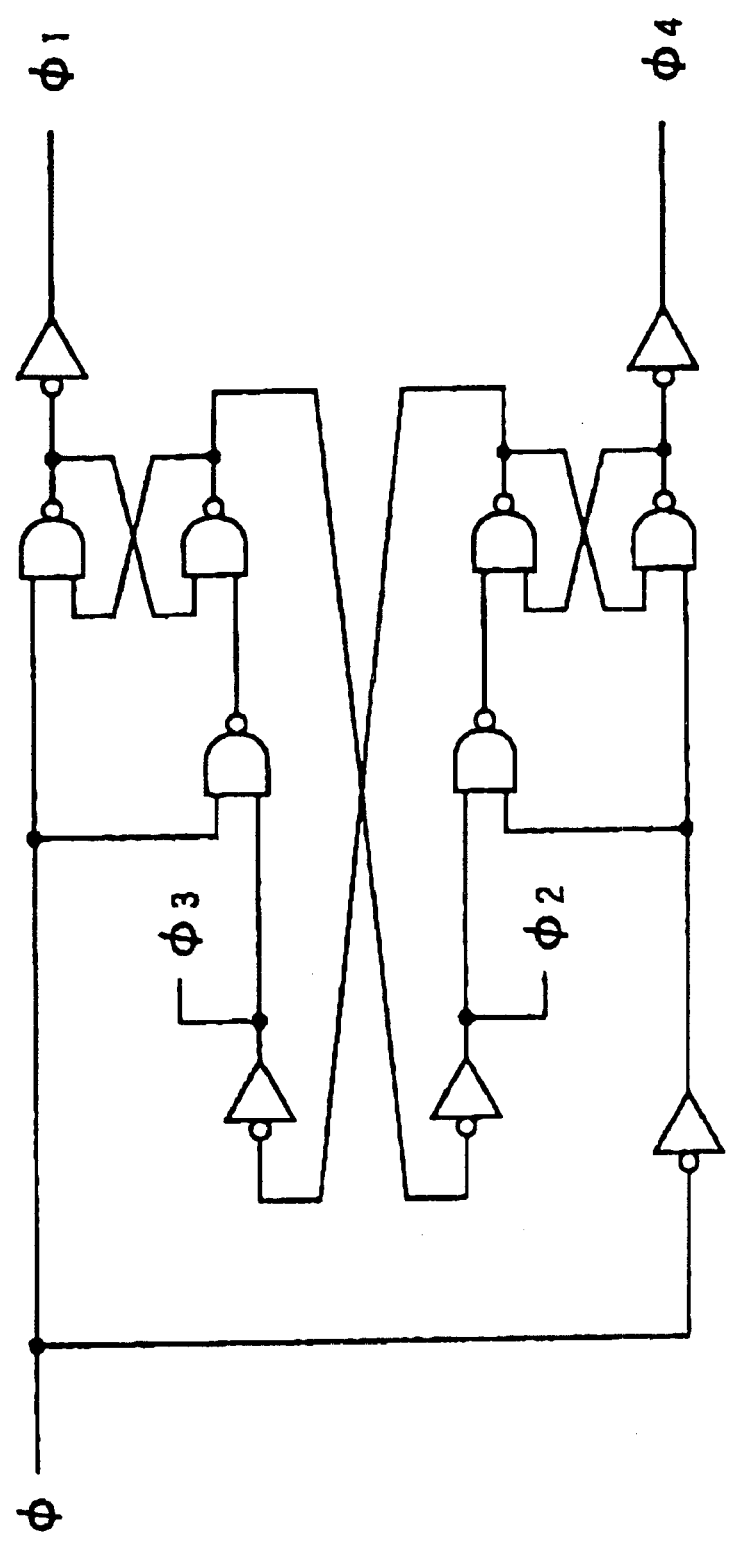
FIG. 9 shows a circuit diagram of a timing generation circuit that is used in the step-up circuit shown in FIG. 8.
Figure 10:
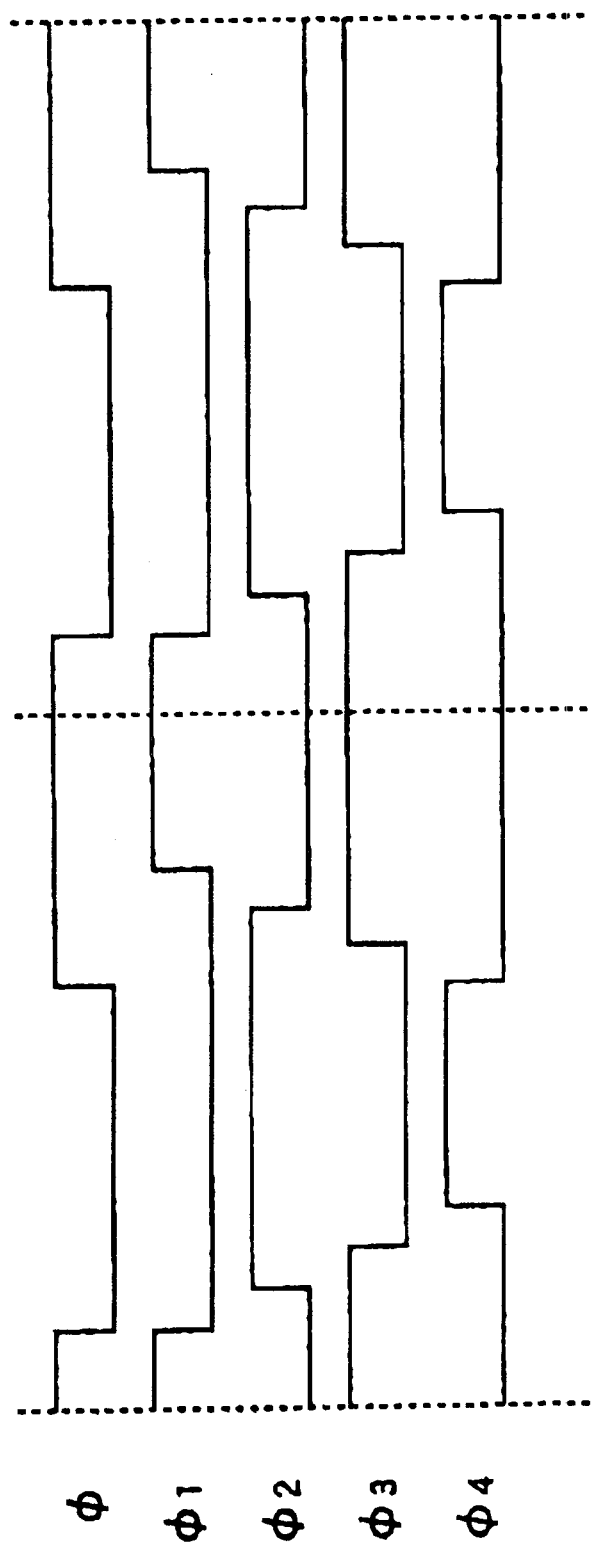
FIG. 10 shows a timing chart of clock signals generated by the step-up circuit shown in FIG. 8.

Next, a step-up circuit in accordance with a third embodiment of the present invention is described with reference to FIG. 6. FIG. 6(a) shows a circuit diagram of a step-up cell of one stage in accordance with the present invention. Also, FIG. 6(b) shows a circuit diagram of a step-up circuit that includes a plurality of the step-up cells and an oscillation block that supplies clock signals to the respective step-up cells.

As shown in FIG. 6(a), in the step-up circuit in accordance with the present embodiment, transistors Q32 and Q33 for discharge are added to each of the nodes of the step-up cell of the second embodiment. As shown in FIGS. 6(a) and (b), a drain of the transistor Q32 included in the step-up cell 30 is connected to the node N31, a source thereof is connected to a wiring path X having a potential that is generally equal to the power supply voltage on a high potential side, and a gate thereof is connected to the power supply voltage $V_{DD}$ on a high potential side. Also, a drain of the transistor Q33 included in the step-up cell 30 is connected to the node N32, a source thereof is grounded, and a gate thereof is connected to a wiring path Y having a potential that is generally equal to the grounding potential.

Next, an operation of the step-up circuit in accordance with the present embodiment is described. Its basis operation is the same as that of the second embodiment. However, when the potential at the node N31 becomes lower than the power supply voltage on a high potential side due to a waveform abnormality, drain current flows in the transistor Q32 to thereby elevate the potential at the node N31. Also, when the potential at the node N32 becomes lower than the grounding potential due to waveform abnormality, drain current flows in the transistor Q33 to thereby elevate the potential at the node N32. It is noted that four-phase clocks are formed by an oscillation method that is the same as in the second embodiment.

In accordance with the embodiment of the present invention, the transistors for discharge assist in discharging charges after a step-up operation is completed, such that an abnormality in the waveform of stepped-up voltage in second and later step-up operations can be eliminated. Also, since the transistors for discharge also operate as rectification transistors during a step-up operation, the time required for stepping up voltage can be shortened.

As described above, in accordance with the present invention, since capacitors are used in common by a step-up circuit and an oscillation circuit, the chip area can be reduced, and the apparatus can be reduced in size. Also, since clock signals having three or more phases are used, a step-up circuit having good utilization efficiency in the use of substrate area can be provided. Furthermore, there is provided a step-up circuit which minimizes abnormality occurrences occur in the waveform of a stepped-up voltage and the step-up speed is high.

What is claimed is:

1. A step-up circuit to step-up a direct current potential applied to a first node and output the same from a second node, comprising:

a plurality of serially connected rectification elements between the first node and the second node;

a plurality of capacitors connected to connection points of the plurality of rectification elements, respectively; and an oscillation loop formed by circularly and serially connecting an odd number of inversion devices, wherein the plurality of capacitors are directly connected to connection points of the inversion devices, respectively, each inversion device inverting an input signal and outputting the same, and supplies an alternating current signal having a specified phase to the plurality of capacitors.

2. A step-up circuit according to claim 1, wherein each of the plurality of rectification elements is formed from an N-channel transistor.

3. A step-up circuit according to claim 1, wherein the plurality of capacitors are connected between connection points of the plurality of rectification elements and connection points of the odd number of inversion devices, respectively.

4. A step-up circuit to step-up a direct current potential applied to a first node and output the same from a second node, comprising:

a first group of N-channel transistors with source and drain paths serially connected between the first node and the second node;

a second group of N-channel transistors that open and close paths between inputs and gates of the first group of N-channel transistors, respectively, according to a potential of an output of the first group of N-channel transistors;

a first group of capacitors connected to connection points of the outputs of the first group of N-channel transistors, respectively;

an oscillation loop formed by circularly and serially connecting an odd number of inversion devices, each inverting an input signal and outputting the same, and supplying an alternating current signal having a specified phase to the first group of capacitors;

a second group of capacitors connected to gates of the first group of N-channel transistors, respectively; and a device that forms a signal to be supplied to the second group of capacitors based on an output signal of a specified one of the inversion devices of the oscillation loop.

5. A step-up circuit according to claim 4, further comprising:

at least one N-channel transistor that moves a positive charge from a node that supplies a power supply potential on a high potential side to at least one of the first group of capacitors; and at least one N-channel transistor that moves a positive charge from a node that supplies a power supply potential on a low potential side to at least one of the second group of capacitors.

6. A step-up circuit according to claim 4, wherein the first group of capacitors are connected between connection points of the first group of N-channel transistors and connection points of the odd number of inversion devices respectively.

7. A step-up circuit according to claim 1, wherein the oscillation loop includes an input, and wherein the alternating current signal is supplied in response to a write control signal provided to said input.

* * * * *